2,917,436

PRODUCTION OF VITAMIN $B_{12}$ BY THERMOPHILES

Herman Baker, New York, and Harry B. Ross, Westbury, N.Y., assignors to International Hormones, Inc., Brooklyn, N.Y., a corporation of New York No Drawing. Application December 23, 1957
Serial No. 704,320

9 Claims. (Cl. 195—125)

This invention relates to the production of vitamin $B_{12}$ by the cultivation of thermophilic organisms on suitable culture media.

Vitamin $B_{12}$ has been produced heretofore by bacterial and fungal action using a variety of strains, nutrients, and fermentative conditions. The organisms which have been employed for this purpose have all been of the types designated psychrophilic or mesophilic, which exhibit optimum growth rates at temperatures ranging from the vicinity of human body heat, i.e. about 37° C., down to a lower limit of 15° to 20° C. Yields have been moderate from these types of organisms, and since under the temperatures range mentioned, other undesired types of organisms also grew well, it has been necessary in all cases to resort to the use of sterilized culture media in the first instance, and to employ elaborate precautions to maintain sterile conditions during fermentation.

In accordance with this invention, it has been found that numerous strains of thermophilic organisms are capable of producing vitamin $B_{12}$ in enhanced yields in comparison with previously employed organisms of other types. These organisms include, for example, thermophilic bacteria of a variety of strains as disclosed hereinafter. These bacteria are of the type which exhibit optimum growth in the presence of a considerable degree of heat. In general, they develop best when cultivated on suitable culture media at temperatures ranging from about 45° to 75° C.

The use of thermophilic bacteria for vitamin $B_{12}$ production has the great advantage that other types of organisms, which are not productive of vitamin $B_{12}$ or are undesirable for other reasons, will not grow in the thermophilic temperature range. Accordingly, it is now possible, when employing our novel process, to operate employing culture media which do not require previous sterilization, and moreover, without the necessity of maintaining sterile conditions during the growth period, with complete avoidance of contamination.

Another advantage of our novel process is that the time period required for the production of a given quantity of vitamin $B_{12}$ is substantially less than that of other currently employed methods.

The use of thermophilic bacteria in accordance with our novel process also makes possible the use of specially developed culture media which are adapted to the needs of these organisms. The selective inclusion of nutrients and omission of certain ingredients not required for these types of organisms has, in accordance with this invention, led to the development of novel culture media, which are less expensive and easier to prepare.

The combined use of the thermophilic organisms and of our new culture media results in yields of vitamin $B_{12}$ per liter of growing broth culture which are from 8 to 10 times the yields obtained commercially in currently used prior art methods.

In accordance with this invention, a nutrient medium, which is preferably the special nutrient medium mentioned above, is inoculated with a vitamin $B_{12}$ producing strain of a thermophilic organism, and growth is maintained under submerged, aerobic conditions at temperatures in the range from about 45° to 75° C., preferably with agitation, until the maximum content of vitamin $B_{12}$ has been attained, whereupon a concentrate of the vitamin $B_{12}$ is recovered from the medium by conventional methods such as heating, addition of acid, and evaporation to give a concentrate useful as animal feed supplement. Other known purification methods may also be used including contacting with adsorbents etc.

The thermophilic organisms utilized in the method of producing vitamin $B_{12}$ in accordance with the present invention are strains of various thermophilic bacilli. Within the preferred embodiment of the present invention these embrace the species stearothermophilus and coagulans. Of the aforementioned species, which fall generally within the present classification system of Bergey's Manual, we have isolated numerous specific strains which produce vitamin $B_{12}$, but with varying degrees of efficiency. Within the broader aspects of the present invention we contemplate the use of other species namely circulans, subtilis, macerans and sphaericus. Certain strains of these species are known to grow at temperatures above 45° C. and are classified as thermophiles (Allen, M. B., 1953, The Thermophilic Aerobic Sporeforming Bacteria Bacterial, Revs. 17 pp. 125–173, and Smith, N. R., R. E. Gordon and F. B. Clark, 1952, Aerobic Sporeforming Bacteria, U.S. Dept. Agr. Monograph No. 16). We have found that strains isolated by us from hot springs, geysers, and like sources occurring in thermal areas in the United States and in Cuba possess especially valuable vitamin $B_{12}$ producing properties.

It will be noted that among the aforementioned species of bacilli, the species *coagulans* and *stearothermophilus* are true thermophiles and will grow at somewhat higher temperatures than the other species mentioned which have sometimes been considered adapted strains of mesophilic bacteria capable of exhibiting active growth at temperatures above 45° C. and up to 55° C. The species *coagulan* and *stearothermophilus* which will grow well at 60° C. and 75° C. respectively have certain advantages over the other mentioned species and are preferred in the process of the present invention. Of the species which have been adapted for growth at higher temperatures the circulans group and especially a specific strain to be hereinafter described in detail, has been found especially desirable, in that high yields of vitamin $B_{12}$ are produced at a relatively high temperature of the order of 55° C.

The thermophilic bacteria which we have isolated from such thermal area sources and which have outstanding capabilities for vitamin $B_{12}$ production include:

Bacillus stearothermophilus 194, deposited in the American type culture collection and designated as ATCC 12986, source Yellowstone geyser mud;

Bacillus coagulans 406, deposited in the American type culture collection and designated as ATCC 12989, source Yellowstone geyser mud; and Bacillus coagulans 416, deposited in the American type culture collection and designated as ATCC 12990, source Old Faithful geyser water;

In addition, we have found that thermophilic bacteria strains isolated from animal feces also have valuable vitamin $B_{12}$ producing powers. An outstanding example of this class of organism is:

Bacillus circulans CI–372, deposited in the American type culture collection and designated as ATCC 12994, source cow dung.

The four strains named above are capable of producing yields of vitamin $B_{12}$ as high as 3 to 6 mg. per liter in non-synthetic media, and from 1 to 2 mg. per liter in synthetic media.

In addition to the aforementioned strains, we have isolated and tested numerous other strains of thermophilic organisms which while less effective, are nevertheless capable of producing vitamin $B_{12}$ in yields of at least 0.5 mg. per liter of medium. These strains include the following:

B. stearothermophilus 1, 27, 32, 35, 63, 67, 72, 79, 90, 109, 137, 148, 149, 150, 152, 155 (ATCC 12987), 160 (ATCC 12988), 167, 189, 195, 197, 202 and 203;

B. coagulans Co 413, Co 432, Co 439, Co 467, Co 491;

B. subtilis SU–381 (ATCC 12993);

B. sphaericus SP–312 (ATCC 12992);

B. Macerans M–314 (ATCC 12991).

The preferred strains for production of vitamin $B_{12}$ are described by their morphological, cultural, and biochemical characteristics as follows:

*Bacillus stearothermophilus 194.*—The characteristics of this bacillus, when grown at 45° to 70° C. are: vegetative rods, 0.5–1.0$\mu$ by 2 to 4$\mu$, motile, gram positive, older rods stain gram variably; sporangia swollen; spores 1 to 2$\mu$ by 1 to 2$\mu$, sometimes oval in shape, spore wall usually stainable; colonies not distinctive when grown on agar. Nutrient agar slants, growth is opaque and spreading; nutrient broth, uniform turbidity; utilization of citrate, negative; hydrolysis of starch, positive; production of acetyl methyl carbinol, negative; pH of broth, from 5 to 7, optimum from 6 to 6.5; hydrolysis of gelatin, positive; fermentation tests: glucose, acid without gas in presence of amino acid. Temperatures for growth: good growth from 45° to 70° C., optimum growth about 55° C. in chemically defined medium or in nutrient broth half diluted with water supplemented casein hydrolysate 0.5%. Storage conditions: agar slants composed of 0.5% polypeptone (Baltimore Biological Laboratories) plus 0.5% beef extract plus 2.5% agar can be stored at 4° C. for more than a year without impairment of the growth of the organism at the temperature range given.

*Bacillus circulans CI–372.*—Characteristics: vegetative rods 0.3 to 0.7$\mu$ by 1.5 to 5$\mu$, ends rounded, motile, gram negative, at times gram variable; sporangia swollen; spores, kidney shaped; colonies, spreading, opaque; nutrient agar slants, growth spready and dense; nutrient broth, turbidity light; utilization of citrate, negative; hydrolysis of starch, positive; production of acetyl methyl carbinol, negative; fermentation tests: acid without gas from glucose, arabinose, xylose, and sucrose; hydrolysis of gelatin, positive; production of indole, negative; temperatures for scanty growth from 28° to 45° C., for good growth from 45° to 60° C.

*Bacillus coagulans 406 and 416.*—Characteristics: vegatative rods, 0.5 to 1.5$\mu$ by 2 to 5$\mu$, motile, gram positive; sporangia, swollen in No. 406, not swollen in No. 416; colonies, opaque; nutrient agar slants, rough, opaque, flat; utilization of citrate, negative; hydrolysis of starch, negative at 55° C., positive after 2 weeks' incubation; fermentation tests, acid from glucose, without gas from glycerol and sucrose; hydrolysis of gelatin, weak; temperatures, optimal growth of both strains from 45° to 65° C., some growth from 37° to 45° C.; storage conditions: organisms can be maintained on agar slants containing 0.5% polypeptone, 0.5% beef extract and 2.5% agar for over one year at 4° C. without hindrance of growth at optimal temperature range given. In a nonsynthetic culture medium, strain 406 will produce from 2 to 3 mg. of vitamin $B_{12}$ per liter, whereas strain 416 will produce between 3 and 6 mg. per liter.

The various above-listed strains are very similar in their general morphological and biochemical characteristics. They are intense aerobes, and exhibit very poor growth under anaerobic conditions. The optimal temperature range for their growth is between about 45° and 65° C. However, B. stearothermophilus 194 may be advantageously grown as high as 75° C. Incubation periods may range from 8 to 72 hours.

We have found that a suitable range for $B_{12}$ production is pH 5 to 8.5 however, for optimal vitamin $B_{12}$ production a pH range of about 6 to 7.5 is indicated, which may be permitted to rise to about 8 to 8.5 at the end of the incubation period. Unless the pH during active growth is maintained within this range the yield of $B_{12}$ is reduced. While this pH may be maintained by the addition of any suitable types of buffers, it has been found that the aconitic acid-triethanolamine combination buffer is best adapted for this purpose, since it is not metabolized by the organisms. For this reason, it is advantageous to avoid the use of phosphate type buffers, which are thus metabolized, eventually with loss of buffering action.

The conditions of sterility ordinarily required for the growth of vitamin $B_{12}$ producing organisms are not necessary in the growth of the thermophilic organisms in accordance with the present invention, although of course sterile conditions may be maintained if desired. The effect of thermophilic growth conditions in avoiding contamination by molds and other foreign organisms may be demonstrated by experiments. These were carried out by exposing nutrient agar seeded with cultures of these thermophiles, at room temperature, for one day in the air of the laboratory. After one day the plates were incubated at 37°, 55°, and 75° C., respectively. After 18 hours of incubation, the plate held at 37° showed growth of molds and other contaminants. The plates held at 55° and 75° showed only growth of the thermophile and no contamination.

As indicated previously, the thermophilic vitamin $B_{12}$ producing organisms may be grown on either nonsynthetic or synthetic types of culture media, by maintaining a quiescent pool of the medium and submerged type of culture, with such aeration as is necessary to maintain aerobic conditions. In either case, it is essential that the medium employed contain all the necessary growth components, including mineral salts, trace elements, amino acids, and the like. These components may be supplied in part by conventional growth media known in the art. Preferably by such mediums as corn steep liquor, barley, potato, rice and other cereal concentrates.

In the preparation of a nonsynthetic type of culture medium, corn steep liquor is preferably employed. Such corn steep liquor will generally possess the following vitamin content:

| | Gamma/gm. |
|---|---|
| Riboflavin | 5 |
| Niacin | 819 |
| Pantothenic acid | 23.8 |
| Pyridoxine | 19.1 |
| Biotin | 0.125 |

It will also possess the following amino acid content:

| Amino acid: | Percent amino acid (hydrolyzed) |
|---|---|
| Leucine | 4.78 |
| Isoleucine | 2.77 |
| Valine | 2.81 |
| Glutamic acid | 7.28 |
| Threonine | 2.54 |
| Lysine | 1.80 |
| Arginine | 2.23 |
| Histidine | 2.18 |
| Proline | 3.39 |
| Phenylalanine | 2.10 |
| Methionine | 0.00 |
| Aspartic acid | 1.39 |
| Cystine | 0.91 |
| Alanine | 15.33 |
| Tyrosine | 0.78 |
| Ammonia | 1.34 |

A nonsynthetic medium suitable for growth of thermophilic bacteria may be prepared having the following composition:

| | | |
|---|---|---|
| Corn steep liquor | ml | 5 |
| Sodium cyanide | mg | 2 |
| Cobalt ion (as $CoSO_4 \cdot 7H_2O$) | mg | 4 |

Citric acid _____ mg__ 100
Triethanolamine _____ mg__ 300
Potassium hydroxide to reach pH 6.0
Distilled water to make 100 ml.

Although sterilization is not necessary, the foregoing medium may be sterilized by autoclaving for 30 minutes under 15 pounds pressure at a temperature of about 118–120° C.

The process of producing vitamin $B_{12}$ utilizing the above culture medium is illustrated by the following examples:

Example I

A medium was prepared by placing 800 cc. of the broth described above in four Roux bottles each of 4 liter capacity, and inoculated with *Bacillus coagulans* 416 (ATCC 12990). Growth was conducted under aerobic conditions. Stirring was unnecessary so long as the bottles were positioned to present a maximum air surface. After 18 hours of growth at 55° C. the broth was adjusted to a pH of 4.5 with citric acid. Upon completion of the incubation period and adjustment of the pH as stated, there was added 1.0 mg. of sodium metabisulfite per each ml. of broth culture to insure reducing conditions for the protection of the released protein bound vitamin $B_{12}$. The protein bound $B_{12}$ is then released by autoclaving the broth including bacilli for 30 minutes at 118° C. The vitamin $B_{12}$ content was determined by a modification of the proposed USP method (U.S. Pharmacopeia, XIV, third suppl., 15–19), using three different test organisms for purposes of comparison. These organisms were *Lactobacillus leichmannii* ATCC 4792, *Euglenia gracilis* (Z strain), and *Ochromonas malhamensis* (Pringsheim strain). The average yield was between 3 and 6 mgs. of vitamin $B_{12}$ per liter of culture medium. The vitamin $B_{12}$ was recovered from the broth by conventional procedures. Thus the autoclaved material may be drum dried at 40° C. to form an animal feed supplement. It is to be noted that during the course of growth the yield begins to approach maximum at the end of 8 hours. At this time the pH of the broth is still the initial pH 6. At the end of 12 hours the production of $B_{12}$ is slightly higher than at the end of 8 hours and the pH of the broth has reached 7.5. The yield is at a maximum at the end of approximately 18 hours when the pH has reached 8 to 8.2. Although the growth may be continued for as long as 72 hours the pH must not be allowed to rise above 8.2 in order to achieve maximum yield.

Example II

A medium was prepared by placing 800 cc. of the broth described above in four Roux bottles each of 4 liter capacity, and inoculated with *Bacillus stearothermophilus* 194 (ATCC 12986). Growth was conducted under aerobic conditions. Stirring was unnecessary so long as the bottles were positioned to present a maximum air surface. After 18 hours of growth at 65° C. the broth was adjusted to a pH of 4.5 with citric acid. Upon completion of the incubation period and adjustment of the pH as stated, there was added 1.0 mg. of sodium metabisulfite per each ml. of broth culture to insure reducing conditions for the protection of the released protein bound vitamin $B_{12}$. The protein bound $B_{12}$ is then released by autoclaving the broth including bacilli for 30 minutes at 118° C. The vitamin $B_{12}$ content was determined by a modification of the proposed USP method (U.S. Pharmacopeia, XIV, third suppl., 15–19), using three different test organisms for purposes of comparison. These organisms were *Lactobacillus leichmannii* ATCC 4792, *Euglenia gracilis* (Z strain), and *Ochromonas malhamensis* (Pringsheim strain). The average yield was between 2 and 3 mgs. of vitamin $B_{12}$ per liter of culture medium. The vitamin $B_{12}$ was recovered from the broth by conventional procedures.

Example III

A medium was prepared by placing 800 cc. of the broth described above in four Roux bottles each of 4 liter capacity, and inoculated with *Bacillus coagulans* 406 (ATCC 12989). Growth was conducted under aerobic conditions. Stirring was unnecessary so long as the bottles were positioned to present a maximum air surface. After 18 hours of growth at 55° C. the broth was adjusted to a pH of 4.5 with citric acid. Upon completion of the incubation period and adjustment of the pH as stated, there was added 1.0 mg. of sodium metabisulfite per each ml. of broth culture to insure reducing conditions for the protection of the released protein bound vitamin $B_{12}$. The protein bound $B_{12}$ is then released by autoclaving the broth including bacilli for 30 minutes at 118° C. The vitamin $B_{12}$ content was determined by a modification of the proposed USP method (U.S. Pharmacopeia, XIV, third suppl., 15–19), using three different test organisms for purposes of comparison. These organisms were *Lactobacillus leichmannii* ATCC 4792, *Euglenia gracilis* (Z strain), and *Ochromonas malhamensis* (Pringsheim strain). The average yield was between 2 and 3 mgs. of vitamin $B_{12}$ per liter of culture medium. The vitamin $B_{12}$ was recovered from the broth by conventional procedures.

Example IV

A medium was prepared by placing 800 cc. of the broth described above in four Roux bottles each of 4 liter capacity, and inoculated with *Bacillus circulans* CI-372 (ATCC 12994). Growth was conducted under aerobic conditions. Stirring was unnecessary so long as the bottles were positioned to present a maximum air surface. After 18 hours of growth at 55° C. the broth was adjusted to a pH of 4.5 with citric acid. Upon completion of the incubation period and adjustment of the pH as stated, there was added 1.0 mg. of sodium metabisulfite per each ml. of broth culture to insure reducing conditions for the protection of the released protein bound vitamin $B_{12}$. The protein bound $B_{12}$ is then released by autoclaving the broth including bacilli for 30 minutes at 118° C. The vitamin $B_{12}$ content was determined by a modification of the proposed USP method (U.S. Pharmacopeia, XIV, third suppl., 15–19), using three different test organisms for purposes of comparison. These organisms were *Lactobacillus leichmannii* ATCC 4792, *Euglenia gracilis* (Z strain), and *Ochromonas malhamensis* (Pringsheim strain). The average yield was between 3 and 6 mgs. of vitamin $B_{12}$ per liter of culture medium. The vitamin $B_{12}$ was recovered from the broth by conventional procedures.

Using either yeast extract or L-glutamic acid as an amino acid source, there has been developed in accordance with this invention a synthetic culture medium suitable for vitamin $B_{12}$ production by thermophilic organisms. Trace elements are provided by adding suitable quantities of a metal mix having the following composition:

| | G. |
|---|---|
| Ethylenediamine tetraacetic acid | 2.5 |
| $ZnSO_4.7H_2O$ | 17.6 |
| $MnSO_4.H_2O$ | 9.22 |
| $CuSO_4.5H_2O$ | 0.98 |
| $FeSO_4(NH_4)_2SO_4.6H_2O$ | 0.7 |
| $H_3BO_3$ | 0.571 |
| $CoSO_4.7H_2O$ | 0.19 |

Distilled water to make 1000 ml.

The synthetic culture medium suitable for use with the organisms listed is illustrated by the following composition:

| | | |
|---|---|---|
| Ethylenediamine tetraacetic acid | g__ | 0.05 |
| $KH_2PO_4$ | g__ | 0.02 |
| $MgSO_4.7H_2O$ | g__ | 0.05 |
| Mo (as ammonium moylbdate) | mg__ | 1.0 |

| | | |
|---|---|---|
| Metal mix solution | ml | 1.5 |
| NH₄Cl | g | 0.03 |
| Ca ion (as CaCl₂) | mg | 1.0 |
| Aconitic acid (trans) | g | 0.5 |
| Triethanolamine | g | 1.0 |
| Sodium acetate.3H₂O | g | 0.04 |
| Glycerol | g | 1.0 |
| Potassium gluconate | g | 0.5 |
| NaCN | mg | 0.2 |
| Sodium metabisulfite | g | 0.1 |
| Succinic acid | g | 0.05 |
| Distilled water | ml | 100 |

To the foregoing composition there may be added L-glutamic acid in amounts ranging from 0.01 to 1.0 g. per 100 ml. of the medium. Alternatively, there may be added yeast extract in an amount of about 0.5 g. per 100 ml. of medium. Additional amounts of sodium cyanide and cobalt ion may also be added.

*Example V*

Using about 800 mg. of the synthetic medium, with addition of 1.9 g. per 100 ml. of glutamic acid, and inoculating the medium with *B. circulans* CI-372, maintaining the pH at about 6.5 at first, with increase to about pH 8 at the end of the incubation there was obtained a vitamin $B_{12}$ yield by assay of 1 mg. per liter of medium.

We claim:

1. A process for preparing vitamin $B_{12}$ which comprises incubating at a temperature between about 55° C. and 75° C. a nutrient medium inoculated with a vitamin $B_{12}$ producing strain of a thermophilic organism having an active growth in the aforementioned temperature range.

2. A process for preparing vitamin $B_{12}$ which comprises incubating at a temperature between about 55° C. and 75° C. a nutrient medium inoculated with a vitamin $B_{12}$ producing strain of a thermophilic bacillus having an active growth in the aforementioned temperature range.

3. A process for preparing vitamin $B_{12}$ which comprises incubating at a temperature between about 55° C. and 75° C. a nutrient medium inoculated with a vitamin $B_{12}$ producing strain of *Bacillus stearothermophilus* having an active growth in the aforementioned temperature range.

4. A process for preparing vitamin $B_{12}$ which comprises incubating at a temperature between about 55° C. and 75° C. a nutrient medium inoculated with a vitamin $B_{12}$ producing strain of *Bacillus coagulans* having an active growth in the aforementioned temperature range.

5. A process for preparing vitamin $B_{12}$ which comprises incubating at a temperature between about 55° C. and 75° C. a nutrient medium inoculated with a vitamin $B_{12}$ producing strain of *Bacillus circulans* having an active growth in the aforementioned temperature range.

6. A process for preparing vitamin $B_{12}$ which comprises incubating at a temperature between about 55° C. and 75° C. a nutrient medium inoculated with a vitamin $B_{12}$ producing strain of a thermophilic bacillus under aerobic conditions having an active growth in the aforementiond temperature range.

7. A process of preparing vitamin $B_{12}$ which comprises incubating at a temperature between about 55° C. and 75° C. a nutrient medium inoculated with a vitamin $B_{12}$ producing strain of a thermophilic bacillus having an active growth in the aforementioned temperature range, said nutrient medium containing a source of amino acid, a source of cobalt ion, trace metals, and a buffer, and recovering the vitamin $B_{12}$ formed from said medium.

8. A process of preparing vitamin $B_{12}$ which comprises incubating at a temperature between about 55° C. and 75° C. a nutrient medium inoculated with a vitamin $B_{12}$ producing strain of a thermophilic bacillus under aerobic conditions at a pH between 6.0 and 7.5, said bacillus having an active growth in the aforementioned temperature range.

9. A process of preparing vitamin $B_{12}$ which comprises incubating a nutrient medium inoculated with a vitamin $B_{12}$ producing strain of a thermophilic bacillus at a temperature between about 55° and 75° C. said bacillus having an active growth in the aforementioned temperature range.

References Cited in the file of this patent

UNITED STATES PATENTS

| | | |
|---|---|---|
| 2,576,932 | Garibaldi | Dec. 4, 1951 |
| 2,595,499 | Wood et al. | May 6, 1952 |
| 2,844,515 | Sobotka et al. | July 22, 1958 |

OTHER REFERENCES

Bergey's Manual of Determinative Bacteriology, 6th ed., 1948, Williams & Wilkins, Baltimore, pp. 714–715.

Darken: The Botanical Review, vol. 19, No. 2, February 1953, p. 112.